UNITED STATES PATENT OFFICE.

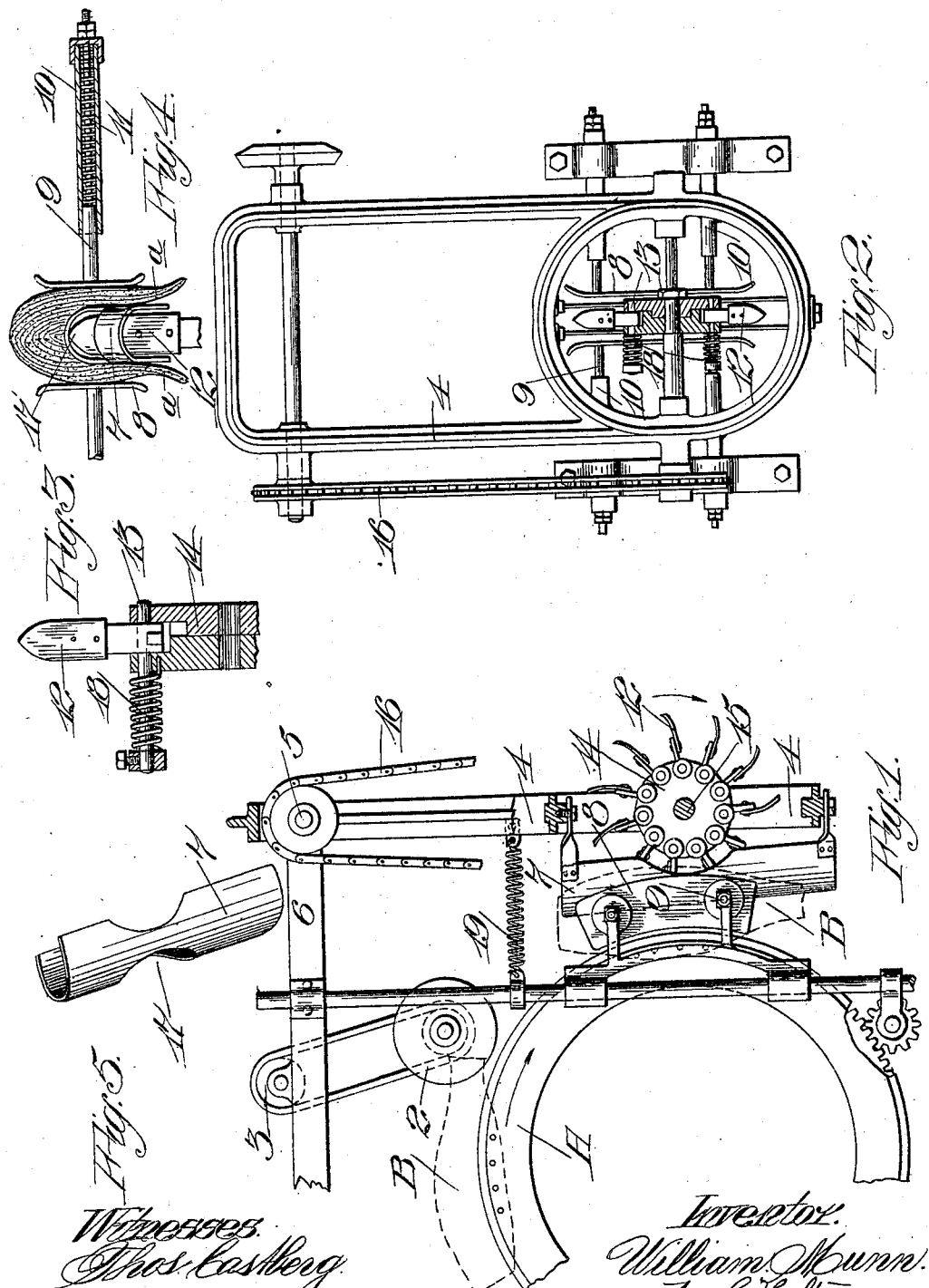

WILLIAM MUNN, OF SAN FRANCISCO, CALIFORNIA, ASSIGNOR TO ALASKA PACKERS ASSOCIATION, OF SAN FRANCISCO, CALIFORNIA, A CORPORATION OF CALIFORNIA.

FISH-CLEANER.

981,300. Specification of Letters Patent. Patented Jan. 10, 1911.

Application filed April 26, 1910. Serial No. 557,703.

*To all whom it may concern:*

Be it known that I, WILLIAM MUNN, a citizen of the United States, residing in the city and county of San Francisco and State of California, have invented new and useful Improvements in Fish-Cleaners, of which the following is a specification.

My invention relates to fish-cleaning apparatus, and particularly to mechanism for disentrailing and scraping the fish.

A purpose of my invention is to provide, in combination with a fish-carrier, a yieldably mounted disemboweling device, means for protecting the sides of the fish after it has been split, and means for supporting the body of the fish while the cleaning is progressing, and an important object of the invention is to provide a disemboweling device of peculiar and advantageous construction.

The invention consists of the parts and the construction and combination of parts as hereinafter more fully described and claimed, having reference to the accompanying drawings, in which—

Figure 1 is a side elevation, partly in section, of the apparatus. Fig. 2 is an end view, partly in section, of the scraper and frame. Fig. 3 is a detail of the scraper construction. Fig. 4 is a diagrammatic section of the supporting device. Fig. 5 is a perspective view of the shield.

My invention comprehends a fish cleaning device adapted to be adjusted with facility and efficiency to machines devised to carry fish during the beheading, scraping, finning and cleaning processes, and therefore I have illustrated only a portion of a carrying mechanism A.

At B is shown, in dotted lines, a fish being conveyed by the carrier.

It is customary to mount upon the machine a splitting device or cutter 2 which may be either a plain disk, saw, or other appropriate blade, and which may be driven by suitable power-transmitting gears 3 so that as the belly of the fish is brought against the blade, it is severed longitudinally. It is important to provide means whereby the slitted fish before it is carried against a disemboweling device, shall have its sides $a$—$a$, Fig. 4, firmly separated and yieldably supported, and to accomplish this I have secured to a frame 4 pivoted loosely on a shaft 5, borne in brackets 6 of the machine, a suitably shaped plow or shield 7. This plow is so disposed relative to the fish carrier A that a fish, as B, having been opened by the cutter 2, passes against and straddles the shield 7. Meanwhile, the spread sides of the fish are encountered and supported by opposed plates or supports 8. These supports are provided with stems 9 slidable in bearings 10, and are made yieldable by suitable cushioning devices as springs 11 in the bearings 10, though a balance weight may be utilized if desired. The fish now being protected on its interior by the shield 7, and prevented from spreading excessively by the supports 8, is carried against a rotary cleaning device comprising a plurality of stiff spades 12 secured upon stems 13, Fig. 3, movable in a disk 14. The disk 14 is carried by a shaft 15, journaled in frame 4, and driven by suitable gearing 16. The spades 12 of the cleaner pass into the belly of the fish through a suitable opening 17 in the shield 7, and being rotated, thoroughly scrape the inner walls of the fish belly, and remove the deleterious matter from the fish.

In order to insure a perfect scouring and cleansing by the spades 12, each is provided with a tension device as spring 18 so fastened to the stem 13 and disk that the blades 12 are normally sustained in the position shown in Fig. 1. By this form of construction the spades, while themselves strong and stiff, and not liable to fracture, are thus yieldably mounted, and in the event a very large or hard fish is carried past the spades, they will swing backward in the disk, and the springs 18 will constantly press the spades into close though not destructive contact with the fish. By this important detail and feature I am able to provide a machine which not only perfectly cleans the fish, but also protects the solid walls from laceration, and which includes scraping elements not subject to breakage or dislocation. The swinging, yieldable frame 4 also affords a means for preventing mutilation of the fish, and is connected to the machine frame by a tension device of desired form, as spring 19.

It is essential to the proper cleaning of fish that the machine be comparatively flexible, and I have secured this flexibility by the specific arrangement of yieldable spades or scrapers 12, the plow 7 on the swinging frame 4, and the cushioned supports 8.

Having thus described my invention, what I claim and desire to secure by Letters Patent is—

1. In a fish cleaning apparatus, the combination of a traveling carrier, a shield over which the split fish passes, a pivotally mounted hanger for the shield, side supporting devices yieldingly mounted in such relation to the carrier and shield that the fish are carried through the devices, said shield being disposed between said supporting devices.

2. In a fish dressing machine, the combination of a traveling carrier, a splitter, means for spreading the split fish, a pivotally suspended hanger for said spreading means, and opposed members for firmly yet yieldably supporting the sides of the fish as it passes over the spreader.

3. In a fish dressing machine, the combination of a traveling carrier, a splitter, a yieldable spreader adapted to enter the split fish, a pivotally suspended spring-pressed hanger to which the spreader is connected, and yieldable supports for the sides of the fish while it is carried past the spreader.

4. In a fish dressing machine, the combination of a carrier, a fish splitter, a spreader over which a fish is carried, a pivotally mounted spring pressed support for the spreader, means for supporting the spread sides of the fish, and means whereby the entrails are removed, said last means including stiff spades and a revoluble carrier therefor, said spades being yieldably mounted in the carrier.

In testimony whereof I have hereunto set my hand in the presence of two subscribing witnesses.

WILLIAM MUNN.

Witnesses:
CHARLES A. PENFIELD,
CHARLES EDELMAN.